(No Model.)

M. L. DARBY.
BENCH HOOK.

No. 459,745. Patented Sept. 22, 1891.

ATTEST:

INVENTOR:
Mathias L. Darby,
By Henry Connett
Attorney

UNITED STATES PATENT OFFICE.

MATTHIAS L. DARBY, OF ELIZABETH, NEW JERSEY, ASSIGNOR OF ONE-HALF TO LOUIS E. MASCOT, OF SAME PLACE.

BENCH-HOOK.

SPECIFICATION forming part of Letters Patent No. 459,745, dated September 22, 1891.

Application filed December 9, 1890. Serial No. 374,009. (No model.)

*To all whom it may concern:*

Be it known that I, MATTHIAS L. DARBY, a citizen of the United States, and a resident of Elizabeth, Union county, New Jersey, have invented certain Improvements in Bench-Hooks, of which the following is a specification.

My invention relates to that class of bench-hooks in which the hook or stop is adjusted through the medium of a screw; and the object of the invention is to produce a simple, cheap, and readily-adjustable device, and at the same time one that will be thoroughly efficient and durable.

The invention will be fully described hereinafter and its novel features carefully defined in the claims.

Figure 1:
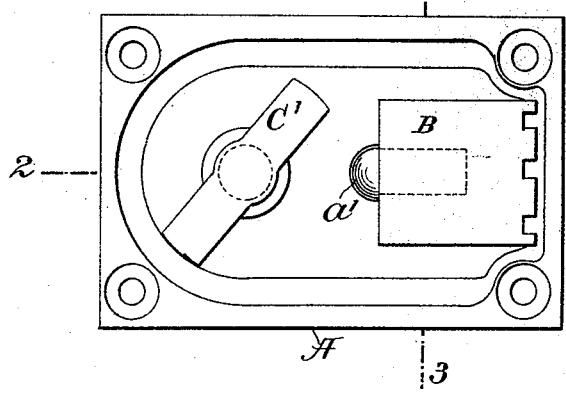
Figure 4:
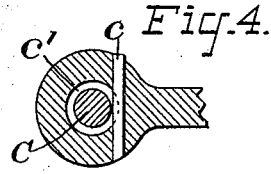
Figure 2:
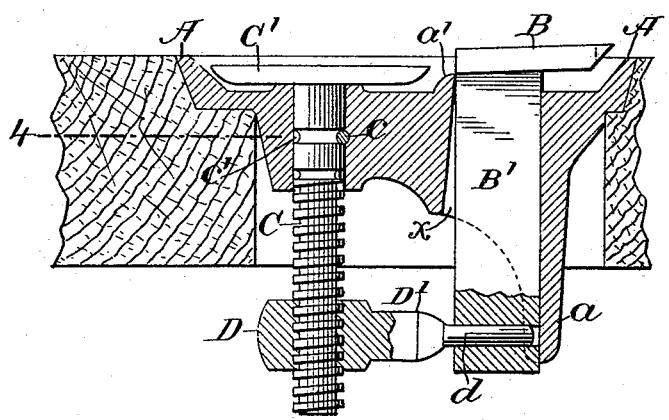
Figure 3:
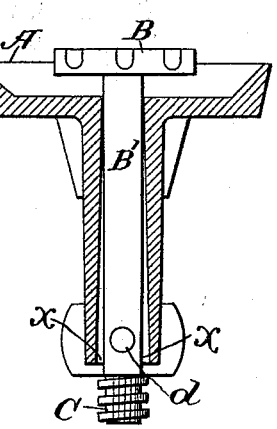

In the accompanying drawings, which serve to illustrate my invention, Figure 1 is a plan view of my improved bench-hook. Fig. 2 is a vertical longitudinal mid-section of the same in the plane of the line 2 2 in Fig. 1. Fig. 3 is a vertical transverse section of the same in the plane of the line 3 3 in Fig. 1. Fig. 4 is a horizontal section of the screw and its boss in the plane of the line 4 in Fig. 2.

A is the cast-metal base-piece of the device.

B is the hook, which may be of the usual form.

B' is the shank of the hook.

C is an adjusting-screw for the hook provided with an operating cross-handle C', and D is a nut which traverses the screw C and has a coupling-stem D', which extends to and enters a socket in the shank of the hook.

The upper face of the base-piece A is recessed, so that the hook B may be brought down until its top is flush with that of the work-bench and so that no part of the handle C' of the screw may rise above the level of the bench. The shank of the hook plays in a socket formed in the base-piece A, the front wall *a* of said socket forming a lower front abutment to receive the pressure from the shank of the hook and a shoulder *a'* on the base-piece behind the hook forming an upper rear abutment. The socket in which the shank of the hook plays is flared at the back and sides of the shank, as seen at *x* in Figs. 2 and 3, whereby the socket is widened at its lower end. This construction facilitates the casting of the base-piece and also tends to prevent the stem of the hook from getting stuck or wedged fast in its socket by dust getting into the same about the hook. The stem fits quite snugly in the socket at its upper end, and any dust that may penetrate to the socket from above will find ample room to work out below, owing to the flaring of the socket. The screw C is collared in a bearing on the base-piece, preferably by means of a pin *c*, (see Figs. 2 and 4,) which is driven through said boss and engages a circumferential groove *c'* in the shank of the screw. This prevents the screw from moving endwise, and it facilitates the assembing of the parts in the manufacture, as it is only necessary to remove this pin in order to separate all the parts of the device, and after they are assembled the insertion of this pin is all that is required to keep the parts together. The screw is mounted to stand substantially parallel with the shank of the hook B. The cross-handle C' may be formed integrally with the screw or it may be affixed thereto. This latter construction is preferable where the screw is formed of a wrought-iron wire or rod. The extremity *d* of the stem of nut D loosely engages a socket or transverse bore in the shank of the hook B, and when the screw C is rotated and the nut travels up or down on the screw it carries with it the hook B through the coupling described. The looseness of the coupling prevents any sticking or jamming of the parts when the adjustment of the hook is being effected, and it facilitates and cheapens the construction of the device by obviating the requirement of excessive accuracy.

To reduce the cost of manufacture without impairing the effectiveness and durability of the device is one of the principal objects I have in view.

Having thus described my invention, I claim—

1. In a bench-hook, the combination, with the base-piece provided with a socket for the shank of the hook, the said hook and its shank, and the screw mounted in a collared bearing in said base-piece, of the nut D on said screw, said nut being provided with a coupling-stem, the extremity of which loosely engages a socket in the shank of the hook, substantially as set forth.

2. In a bench-hook, the combination, with the base-piece provided with a flared socket for the shank of the hook, as set forth, and abutments $a$ and $a'$ at the front and rear of said shank, respectively, of the said hook and its shank, the collared screw C, mounted in the base-piece substantially parallel with the shank of the hook, and the nut on said screw provided with a stem which engages a transversely-arranged socket in the stem of the hook, as set forth.

3. In a bench-hook, the combination, with the base-piece, of the screw C, mounted in the base-piece and provided with a circumferential groove, of the pin $c$, passing through the base-piece and engaging the groove in said screw C, whereby the screw is locked against removal from the base-piece, substantially as set forth.

In witness whereof I have hereunto signed my name in the presence of two subscribing witnesses.

MATTHIAS L. DARBY.

Witnesses:
HENRY CONNETT,
J. D. COPLINGER.